UNITED STATES PATENT OFFICE.

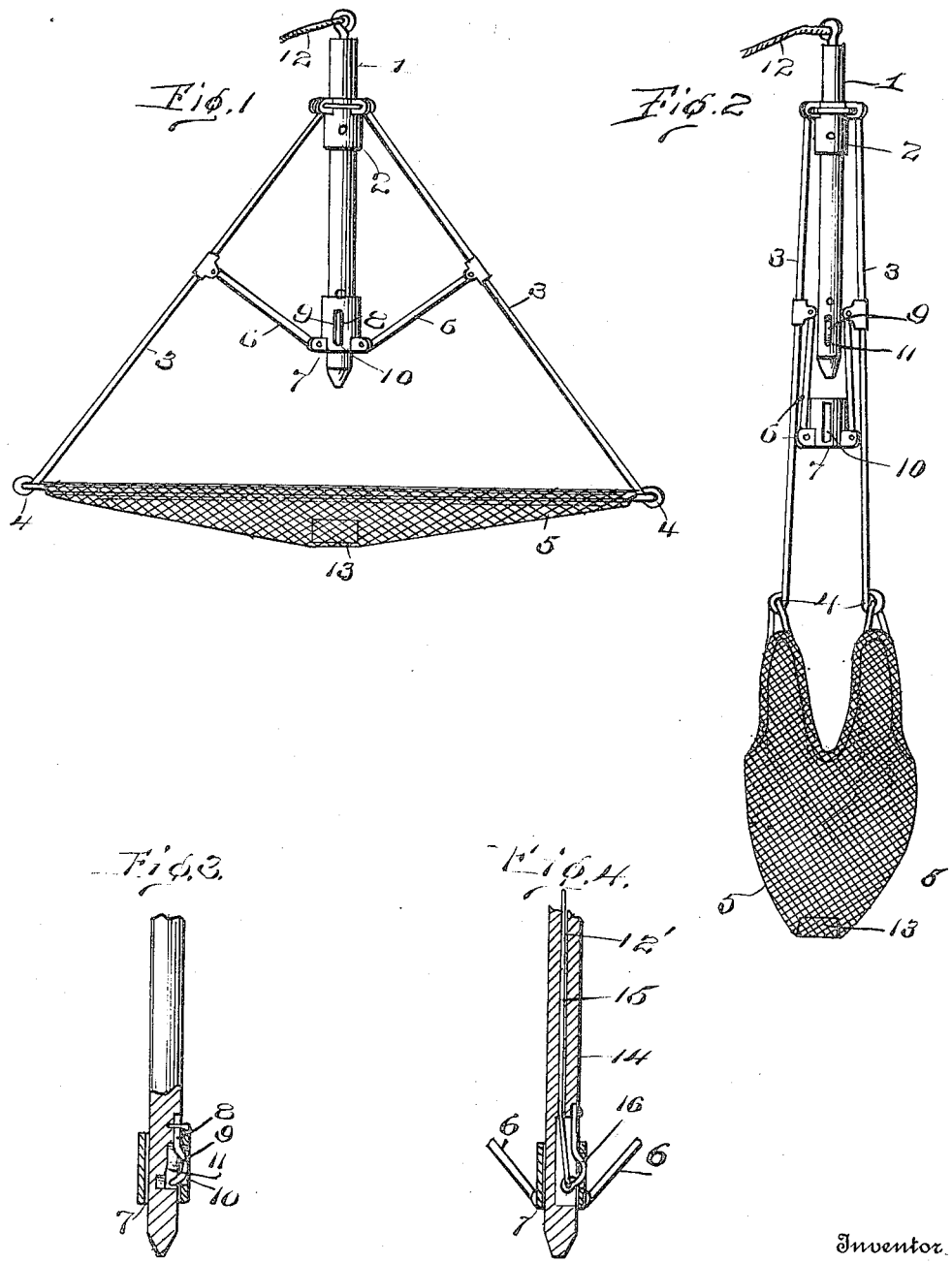

ISAIAH C. CRANE, OF INDIANAPOLIS, INDIANA.

MEANS FOR CATCHING AND ENTRAPPING MINNOWS.

1,036,574.

Specification of Letters Patent.

Patented Aug. 27, 1912.

Application filed September 20, 1911. Serial No. 650,357.

*To all whom it may concern:*

Be it known that I, ISAIAH C. CRANE, a citizen of the United States, residing at Indianapolis, in the county of Marion and State of Indiana, have invented certain new and useful Improvements in Means for Catching and Entrapping Minnows; and I do hereby declare the following to be a full, clear, and exact description of the invention, such as will enable others skilled in the art to which it appertains to make and use the same.

My invention relates to new and useful improvements in means for catching and entrapping minnows and my object is to provide a net and arms for holding the same in extended position so that when the net is placed in the water it will be spread over a considerable portion of the surface of the bed of the stream.

A further object is to hingedly secure the upper ends of the arms to a staff or rod, whereby the arms will swing together and permit the net to fold.

A further object is to provide spreaders for the arms and hingedly secure the inner ends thereof to a sliding ferrule.

A further object is to provide a latch on the staff adapted to engage and normally hold the ferrule in engagement with the staff, and, A further object is to attach a line to the staff, whereby when a sudden upward pull is made thereon, the ferrule will be released from the latch and the net permitted to close in folded position.

Other objects and advantages will be hereinafter set forth and pointed out in the following specification.

In the accompanying drawings which are made a part of this application, Figure 1 is a side elevation of the device in its extended position. Fig. 2 is a similar view showing the parts of the device folded together. Fig. 3 is a sectional view showing the ferrule and the latch for securing the same, and, Fig. 4 is a similar view showing a slightly modified form of latch and means for releasing the same.

Referring to the drawings in which similar reference numerals designate corresponding parts throughout the several views, 1 indicates the staff which is preferably circular in cross section, to the upper portion of which is fixed a sleeve 2, said sleeve having arms 3 pivotally attached thereto. There are preferably four of the arms 3, which when in their extended positions form substantially a pyramidal frame, the lower ends of the arms having loops 4 to which are secured the corners of a net 5.

When the arms 3 are in their extended position, the net 5 will be spread to its fullest extent, but when the arms are swung inwardly the net will fold together and form a trap or sack in which to imprison the minnows. The arms 3 are normally held in their extended positions by means of spreaders 6, the outer ends of which are pivotally secured to the arms, while the inner ends thereof are pivotally secured to a ferrule 7 and said spreaders are so arranged that they will always extend to an upward angle from the ferrule, whereby when a sufficient inward pressure is directed against the arms the ferrule will be moved downwardly and the arms permitted to fold together.

The ferrule is normally held in its upward position by means of a spring latch 8, said latch being provided with a substantially semicircular portion 9 which circular portion extends through a slot 10 in the ferrule, the lower end of the latch being anchored in a recess 11 in the staff 1, while the upper end of the latch is left free so as to move into the recess when inward pressure is applied on the semicircular portion of the latch.

A line 12 or similar device is attached to the upper end of the staff 1 so that the device may be readily lowered into or raised from the water and by constructing the latch and ferrule in the manner shown, a sharp upward pull on the line 12 will cause the ferrule to spring the latch 8 inwardly and permit the ferrule to move downwardly, thereby releasing the pressure of the spreaders against the arms and permitting said arms and the net to fold together and it will be readily seen that any minnows over the net will be readily entrapped in the folds thereof when the net is being removed from the water.

In order to readily attract the minnows to a position over the net, a receptacle 13 is secured substantially at the central portion of the net in which is placed any suitable form of bait or other substance for attracting the minnows, said receptacle also acting as a weight to cause the central portion of the net to descend when the net is being folded together.

In Fig. 4 of the drawings I have shown a slightly modified means for releasing the latch from the ferrule and in this instance the staff 14 is provided with a central bore 15, through which the line 12' is extended, the lower end of the line being attached to an eye 16 formed on the upper end of the latch and by this construction it will be readily seen that when an upward pull is made on the line, said pull is directed first against the latch and moves the latch inwardly until it is released from the slot in the ferrule, the operation of the device in other respects being identical with the previously described structure.

In operation the ferrule is moved upwardly on the staff until the latch 9 engages the slot in the ferrule, this operation spreading the arms 3 to their full extent and opening the net 5. Suitable bait is then placed in the receptacle on the net after which the device is lowered into the water until the net rests upon the bed of the stream where it remains until the minnows have collected over the receptacle in an endeavor to reach the bait. A sharp upward pull is then given the line 12 which will cause the ferrule to depress the latch and release the ferrule from the staff, a continued upward pull causing the arms to move inwardly and the net to fold together, thereby entrapping so many of the minnows as may be positioned over the net when a pull is given on the line.

By arranging the device so that the net will fold together as soon as an upward pull is made on the line, it will be readily seen that the minnows will be prevented from escaping as would be the case were the net retained in its spread position while being removed from the water.

What I claim is:—

In a device of the class described the combination with a staff, a sleeve secured to the staff adjacent its upper end and a line connected to the staff, of a plurality of arms pivoted to the sleeve and extending downwardly therefrom, the lower ends of the arms terminating in loops, a net attached to said loops and adapted to be held in spread position when the arms are swung outwardly, a ferrule slidably mounted on the lower end of the staff, said ferrule having a slot therein, a spring having one of its ends secured to the staff adjacent its lower end, the opposite end of the spring having a curved portion to enter said slot, spreaders extending upwardly from the ferrule and pivotally secured thereto, the opposite ends thereof being pivoted to the arms, said spreaders directing downward pressure on the ferrule when an upward pull is given the staff, whereby the ferrule will be released from the latch and the net permitted to fold while immersed in water.

In testimony whereof I have signed my name to this specification in the presence of two subscribing witnesses.

ISAIAH C. CRANE.

Witnesses:
ARTHUR HUTTO,
HENRY E. BRUNER.